United States Patent

[11] 3,585,604

[72] Inventor John George Lloyd
Uxbridge, Middlesex, England

[21] Appl. No. 792,064
[22] Filed Jan. 17, 1969
[45] Patented June 15, 1971
[73] Assignee Bell Punch Company Limited
The Island Uxbridge, Middlesex, England
[32] Priority Jan. 19, 1968
[33] Great Britain
[31] 3059/68

[54] CALCULATING MACHINES
7 Claims, 2 Drawing Figs.

[52] U.S. Cl. .......... 340/172.5
[51] Int. Cl. .......... G06f 3/00

[50] Field of Search .......... 340/172.5; 235/157

[56] References Cited

UNITED STATES PATENTS 3,343,137 9/1967 Inaba et al. .......... 340/172.5

*Primary Examiner*—Raulfe B. Zache
*Attorney*—Laurence R. Brown

ABSTRACT: A calculating machine wherein several shift registers store numbers. Each shift register has a buffer stage with gating means. Pulse trains are introduced at the gating means as input pulses for controlling the outputs of the shift registers.

Inventor
John George Lloyd
By Laurence R. [signature]
Attorney

Inventor
John George ...
By ... Attorney

CALCULATING MACHINES

This invention has reference to calculating machines and has particular reference to number store registers used in calculating machines for the storage of trains of digit pulses. Such a number store register comprises a plurality of stages, each stage serving to store a digit number representative of the train of digit pulses applied to it.

An object of this invention is to provide an improved calculating machine.

A further object of this invention is to provide a number store register which is or may be used in calculating machines.

According to the invention there is provided a calculating machine having a number store register with a plurality of stages comprising a plurality of multistage shift registers with a shift register buffer stage associated with each multistage shift register, an input of each of the shift register buffer stages being connected to a source of trains of digit pulses; a plurality of gate circuits, the output of a gate circuit being connected to the input of a shift register buffer stage connected to the source of trains of digit pulses, the inputs of the gate circuits being connected in a logic sequence to the outputs of the shift register buffer stages; whereby, when a train of digit pulses is applied to the inputs of the plurality of shift register buffer stages, the gate circuits operate in accordance with the logic sequence to control the entry of the digit pulse count of the train of digit pulses into the plurality of shift register buffer stages.

Figure 1:
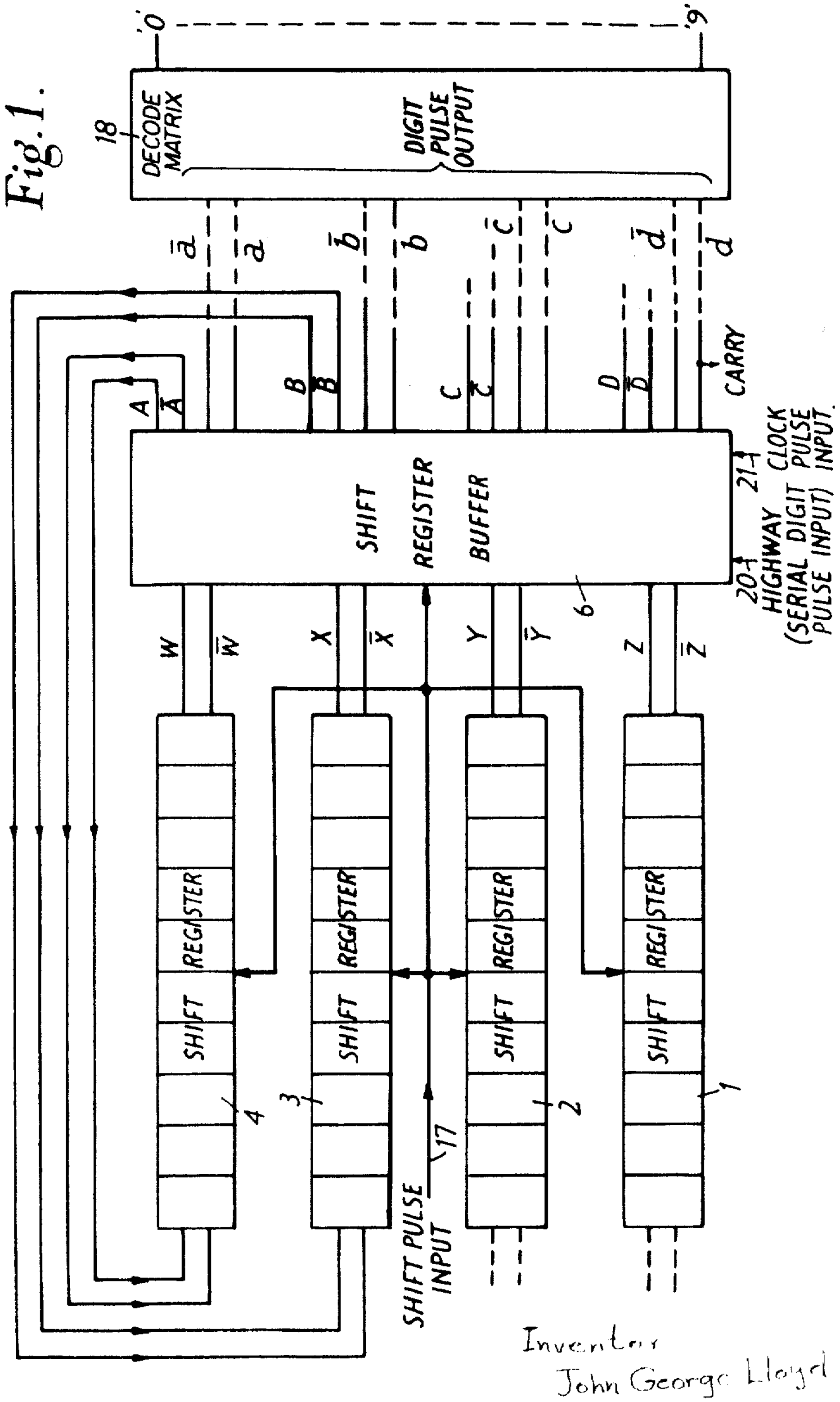
Figure 2:
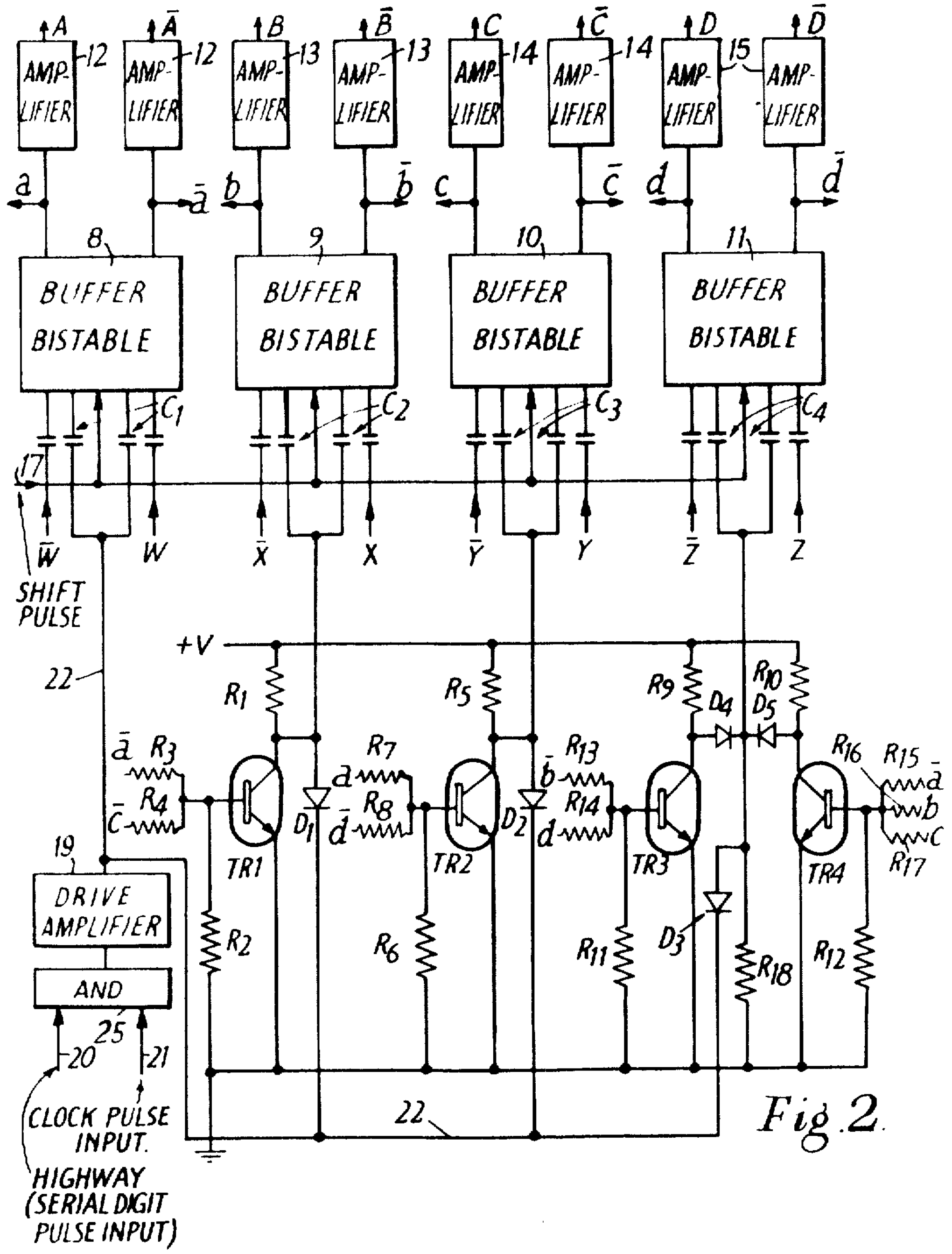

A constructional embodiment made in accordance with the invention will now be described by way of example, with reference to the accompanying drawings wherein:

FIG. 1 shows a schematic drawing of a number store register made in accordance with the invention; and FIG. 2 shows the shift register buffer of FIG. 1 in greater detail.

The drawings of a number store register made according to the invention shows four multistage shift registers 1, 2, 3 and 4 respectively the outputs W and $\bar{W}$, X and $\bar{X}$, Y and $\bar{Y}$ and Z and $\bar{Z}$ of which are connected in parallel to a shift register buffer 6. Each of the multistage shift registers 1, 2, 3 and 4 comprises a chain of shift bistable circuits connected together in cascade. Each multistage shift register represents a binary weight of the binary code in which a decimal digit number is stored in a digit stage comprising the corresponding four shift bistable circuits of the multistage shift registers 1 to 4. The outputs of each of the shift registers 1 to 4 are connected within the shift register buffer 6 to the respective inputs of four shift register buffer stages in the form of four buffer bistables 8, 9, 10 and 11 which together form a number stage. The outputs $a$ and $\bar{a}$, $b$ and $\bar{b}$, $c$ and $\bar{c}$ and $d$ and $\bar{d}$ of the buffer bistables 8 to 11 respectively are connected to the inputs of the pairs of amplifier circuits 12, 13, 14 and 15 respectively. The pairs of amplifier circuits 12, 13, 14 and 15 each comprise a pair of separate transistor 'emitter follower' circuits the inputs of which are connected to the outputs of a buffer bistable respectively. Thus the inputs to the pair of amplifier circuits 12 are connected to the outputs $a$ and $\bar{a}$ respectively of the buffer bistable 8, etc. The outputs from the pairs of amplifier circuits 12, 13, 14 and 15 are connected to the inputs A and $\bar{A}$, B and $\bar{B}$, C and $\bar{C}$ and D and $\bar{D}$ respectively of the multistage shift register 1, 2, 3 and 4 respectively so that each pair of amplifier circuits forms a circulating loop with the multistage shift register connected to it. A shift pulse line 17 is connected to the shift registers 1 to 4, to the buffer bistables 8 to 11 and to a source of trains of shift pulses (not shown). The buffer bistable outputs $a$ and $\bar{a}$, and $b$ and $\bar{b}$, $c$ and $d$ and $\bar{d}$, which are identical in polarity and phase relationship to the amplifier circuit outputs A and $\bar{A}$, B and $\bar{B}$, C and $\bar{C}$ and D and $\bar{D}$, form the outputs of the number store register and are connected to a decoder means such as a decimal decoder matrix 18 (FIG. 1).

As shown in FIG. 2 the shift register buffer 6 also comprises a drive amplifier 19 whose input is connected to the output of a two-input AND gate 25. One of the inputs of the AND gate 25 is connected by a highway 20 to a source of trains of digit pulses (not shown), and the other input of the AND gate 25 is connected by a clock pulse line 21 to a source of clock pulses (not shown) which originates from the same pulse source as the source of shift pulses (not shown). The output of the drive amplifier 19 is connected by an output line 22 through a pair of capacitors C1 to both of the inputs of the buffer bistable 8 and also to both of the inputs of the buffer bistables 9, 10 and 11 through the pairs of capacitors C2, C3 and C4 and the diode D1, D2 and D3 respectively. The anode of the diode D1 is connected to the collector of an NPN transistor TR1 whose emitter is connected to earth and whose collector is connected to a potential of +V volts through a collector resistor R1. The base of the transistor TR1 is connected to earth via a resistor R2 and is connected to the buffer bistable outputs $\bar{a}$ and $\bar{c}$ via resistors R3 and R4 respectively. The transistor TR1 and the resistors R1 to R4 form a NOR gate circuit to the input of buffer bistable 9. The anode of the diode D2 is connected to the collector of an NPN transistor TR2 whose emitter is connected to earth and whose collector is connected to a potential of +V volts through a collector resistor R5. The base of the transistor TR2 is connected to earth via a resistor R6 and is connected to the buffer bistable outputs $a$ and $d$ via resistors R7 and R8, respectively. The transistor TR2 and the resistors R5 to R8 form a NOR gate circuit to gate the input of the buffer bistable 10. The anode of the diode D3 is connected to the cathodes of the diodes D4 and D5. The collectors of the NPN transistors TR3 and TR4 are connected to the anodes of the diodes D4 and D5 respectively and are connected to a potential of +V volts through the collector resistors R9 and R10 respectively, the emitters are connected to earth and the bases are connected to earth through the resistors R11 and R12 respectively. The base of the transistor TR3 is connected to the buffer bistable outputs $\bar{b}$ and $d$ via resistors R13 and R14 respectively. The base of the transistor TR4 is connected to the buffer bistable outputs $a$, $b$ and $c$ via the resistors R15, R16 and R17 respectively. The anode of the diode D3 and the cathodes of the diodes D4 and D5 are connected to earth via a resistor R18. The transistor TR3 and the resistors R9, R11, R13 and R14 and the transistor TR4 and the resistors R10, R11, R13 and R14 and the transistor TR4 and the resistors R10, R12, R15, R16 and R17 both form NOR gate circuits which gate the input of the buffer bistable 11. The diodes D4 and D5 act as OR gates so that either the NOR gate circuit including the transistor TR3 or the NOR gate circuit including the transistor TR4 can act independently to gate the input of the buffer bistable 11.

The number store register operates as follows:

Shift pulses applied via the shift pulse line 17 cause the pulse counts stored in the stages of the multistage shift registers 1, 2, 3 and 4 to successively shift into and out of the buffer bistables 8, 9, 10 and 11. There is sufficient time between adjacent shift pulses for a train of up to ten digit pulses which are supplied at and gated with the clock pulses to be supplied to the buffer bistables 8 to 11 from the drive amplifier 19 via the highway 20 and the clock pulse line 21. In other words, the clock pulse frequency is ten or more times the shift pulse frequency. The train of digit pulses from the output of the drive amplifier 19 is applied by means of the output line 22 directly to the inputs of the shift bistable 1 and each digit pulse causes the outputs $a$ and $\bar{a}$ of the buffer bistable 1 to change state.

The train of digit pulses from the output amplifier 19 is also applied via the output line 22 to the cathodes of the diodes D1 to D3 which are in the input lines of the buffer bistables 8 to 11 respectively. The digit pulses will only reach any or all of the buffer bistables 9 to 11 if any or all of the anodes of D1 to D3 respectively are positive with respect to their cathodes, i.e. diodes D1 to D3 are forward biased; and this condition can only be fulfilled if any or all of the transistors TR1 to TR4 respectively are nonconduction. Since the gate circuits formed by the transistors TR1 to TR4 are NOR logic circuits, any transistors TR1 to TR4 will be nonconducting only when all the buffer bistable inputs connected to the base of this any transistor are at earth potential. If any input of a transistor TR1 to TR4 is at a potential of +V volts the transistor conducts and the corresponding diode D1 to D3 is at or near earth potential, i.e. the corresponding diode D1 to D3 is reversed biased, so that the digit pulse applied to this corresponding diode D1 to D3 does not reach its respective buffer bistable 9 to 11.

The interconnections between the base resistors of transistors TR1 to TR4 and the outputs of the buffer bistables 8 to 11 cause the outputs of the buffer bistables 8 to 11 to be related to the input of digit pulses by the logic sequence shown in the following tabular form: 0=0 Volts; 1=+*V* Volts.

TABLE 1

| | Buffer bistable outputs | | | |
|---|---|---|---|---|
| | "a" | "b" | "c" | "d" |
| Input digit pulse Number: | | | | |
| 0 | 0 | 0 | 0 | 0 |
| 1 | 1 | 0 | 0 | 0 |
| 2 | 0 | 0 | 0 | 1 |
| 3 | 1 | 0 | 1 | 1 |
| 4 | 0 | 1 | 1 | 1 |
| 5 | 1 | 1 | 0 | 1 |
| 6 | 0 | 1 | 0 | 1 |
| 7 | 1 | 1 | 1 | 1 |
| 8 | 0 | 0 | 1 | 1 |
| 9 | 1 | 0 | 0 | 1 |
| 0 | 0 | 0 | 0 | 0 |

The NOR gate circuit containing the transistor TR3 and connected to the buffer bistable outputs $\bar{b}$ and *d* is used to suppress the six redundant buffer bistable outputs. The six redundant buffer bistable outputs are the difference between the sixteen buffer bistable outputs possible with the four buffer bistables 8, 9, 10 and 11 and the ten buffer bistable outputs shown in Table 1. This NOR gate containing the transistor (not shown) to set up the initial conditions when the calculating machine is switched on, to prevent the input digit pulses from achieving a redundant buffer bistable output and cycling around a loop of these redundant buffer bistable outputs.

The outputs *a* and $\bar{a}$, *b* and $\bar{b}$, *c* and $\bar{c}$ and *d* and $\bar{d}$ of the buffer bistables 8 to 11 are connected to a decimal decoder means such as a decimal decoder matrix 18 so that the buffer bistable outputs shown in the Table 1 are decoded as single decimal line outputs corresponding to the digit pulse inputs shown in Table 1. The output *d* of the buffer bistable 11 may be used as a 'carry' pulse which indicates the change of state from digit pulse '9' to digit pulse '0' and which also indicates that the buffer bistables 8 to 11 of the shift register buffer 6 are all in the 'clear' state.

The number store register previously described may be used for the well-known method of subtraction in which the nines complement of the number to be subtracted is added to the number in the number store register and unity is added to the new number in the number store register.

Integrated circuit techniques may be used to make part or all of the number store registers described and the circuit described may be modified to take advantage or to make use of, these techniques.

The source of trains of digit pulses (not shown) which is connected to the highway 20, may be the output of a second number store register of identical construction to the number store register previously described. The output of this second number register may be connected to the highway 20 through a pulse generator and interregister gating circuits (both not shown) so as to form a two-register system. The digit pulse counts stored in the second number store register (not shown) can be successively added to or subtracted from the digit pulse counts stored in the number store registers shown in FIG. 1 under the control of the clock and shift pulses and the interregister gating circuits (not shown). The number store register shown in FIG. 1 can be cleared by adding clock pulses to the digit pulse count stored on the buffer bistables 8 to 11 until the 'carry' pulse is generated, which 'carry' pulse stops the supply of clock pulses until after the next 'shift' pulse has shifted the next digit pulse count into the buffer bistables 8 to 11.

What I claim is:

1. A calculating machine having a number store register with a plurality of stages comprising a plurality of multistage shift registers with a shift register buffer stage connected to process output signals from each multistage shift register, an input of each of the shift register buffer stages being connected to a source of trains of digit pulses; a plurality of gate circuits, the output of a gate circuit being connected to the input of a shift register buffer stage connected to the source of trains of digit pulses, the inputs of the gate circuits being connected in a logic sequence to the outputs of the shift register buffer stages; whereby, when a train of digit pulses is applied to the inputs of the plurality of shift register buffer stages, the gate circuits operate in accordance with the logic sequence to control the entry of the pulse count of the train of digit pulses into the plurality of shift register buffer stages.

2. A calculating machine according to claim 1, wherein each stage of said plurality of shift register buffer stages and the stages of the multistage shift registers include bistable circuits which are connected to a source of shift pulses, the frequency of the digit pulses from the trains of digit pulses being at least ten times the frequency of the shift pulses from the source of shift pulses.

3. A calculating machine according to claim 2, wherein the number store register further comprises a two-input AND gate, one input on the gate being connected to the source of trains of digit pulses the other input being connected to a source of clock pulses, the frequency of the clock pulses and the digit pulses being the same, the frequency of the clock pulses from the source of clock pulses being at least ten times the frequency of the shift pulses from the source of shift pulses, and an output amplifier whose input is connected to the output of the AND gate circuit and whose output is connected to the input of the plurality of shift register buffer stages.

4. A calculating machine according to claim 1, wherein the number store register further comprises a plurality of amplifier circuits which correspond in number to number of outputs of the plurality of multistage registers, the input to an amplifier circuit being connected to an output of a shift register buffer stage and the output of the amplifier circuit being connected to the input of that multistage shift register to which the output of the shift register buffer circuit is connected.

5. A calculating machine according to claim 1, wherein the number store register further comprises a decoder means whose input is connected to the outputs of the plurality of shift register buffer stages.

6. A calculating machine according to claim 5, wherein the decoder means comprises a decimal decoder matrix whose inputs are connected to the outputs of the plurality of shift register buffer stages respectively and whose outputs are ten lines which corresponding to the decimal digits; whereby, when a pulse count is stored in the plurality of shift register buffer stages, the decoder matrix energizes the output lines corresponding to the decimal digit corresponding to the stored pulse count.

7. A calculating machine according to claim 1, wherein each number stage the plurality of said multistage shift registers connected to a respective shift register buffer stage comprises a plurality of binary processing units connected in a circulating loop which represents a binary weight of the binary code for a decimal digit number stored in that number stage.